(12) United States Patent
Sanadidi et al.

(10) Patent No.: US 10,528,915 B1
(45) Date of Patent: Jan. 7, 2020

(54) BAKED SANDWICH AND METHOD OF ITS PREPARATION AND SALE

(76) Inventors: Mohammad Yahya Sanadidi, Santa Monica, CA (US); Ezedin Yahya Sanadidi, Santa Monica, CA (US)

( * ) Notice: Subject to any disclaimer, the term of this patent is extended or adjusted under 35 U.S.C. 154(b) by 719 days.

(21) Appl. No.: 12/381,619

(22) Filed: Mar. 13, 2009

Related U.S. Application Data

(60) Provisional application No. 61/069,523, filed on Mar. 14, 2008.

(51) Int. Cl.
  *G06Q 10/06* (2012.01)
  *G06Q 10/08* (2012.01)
  *G06Q 10/10* (2012.01)
  *G06Q 30/06* (2012.01)

(52) U.S. Cl.
  CPC .................................. *G06Q 10/101* (2013.01)

(58) Field of Classification Search
  CPC .................................................... G06Q 10/101
  USPC .................................................... 705/1.1–912
  See application file for complete search history.

(56) References Cited

U.S. PATENT DOCUMENTS

| | | | | |
|---|---|---|---|---|
| 2,228,516 A | * | 1/1941 | Harriss | A21C 11/10 |
| | | | | 425/266 |
| 2,700,939 A | * | 2/1955 | Liston | A21B 3/00 |
| | | | | 425/122 |
| 5,296,247 A | * | 3/1994 | Huang et al. | 426/283 |
| 5,385,745 A | * | 1/1995 | Dromgoole | A47J 27/14 |
| | | | | 426/392 |
| 6,156,356 A | * | 12/2000 | King | A21C 9/066 |
| | | | | 426/100 |
| 2005/0256774 A1 | * | 11/2005 | Clothier | B65G 54/02 |
| | | | | 705/15 |
| 2006/0196883 A1 | * | 9/2006 | Ward | G07F 17/0078 |
| | | | | 221/2 |
| 2007/0017383 A1 | * | 1/2007 | Westberg | A21C 9/04 |
| | | | | 99/349 |
| 2007/0292575 A1 | * | 12/2007 | Ofir | A21C 9/085 |
| | | | | 426/503 |
| 2008/0032018 A1 | * | 2/2008 | Garniss | A21B 1/48 |
| | | | | 426/523 |
| 2008/0124434 A1 | * | 5/2008 | Hrudka | G06Q 10/087 |
| | | | | 426/233 |
| 2011/0059209 A1 | * | 3/2011 | Khatchadourian | A21D 13/41 |
| | | | | 426/232 |
| 2012/0185086 A1 | * | 7/2012 | Khatchadourian | A21D 8/02 |
| | | | | 700/233 |

OTHER PUBLICATIONS

Carmen B., Baked Deli Sandwich Recipe, Nov. 9, 2006, www.Foods.com, pp. 1-2 at http://www.food.com/recipeprint.do?rid=194698.*
O'Maonaigh et al., Press Clips, Apr. 27, 2006 Metro Detroit Fuddruckers, pp. 1-5 at www.archive.org via http://web.archive.org/web/20060427204313/http://www.metrodetroitfudds.com/press.asp.*
Kohn, Greg, Fuddrickers—making a good name for fast food, Apr. 10, 2008, Silver Chips Online, pp. 1-3 at http://silverchips.mbhs.edu/story/print/8288.*
Campion, Charles, Independent Slice of the Action, Feb. 14, 2007, http://www.thisislondon.co.uk/restaurants/article-23385525-independent-slice-of-the-action.do.*
JBC, et al., Bella Pita—New Falafel Specialist in Westwood, Apr. 24, 2007, CHOW, Chowhound Discussions, http://chowhound.chow.com/topics/395024.*
Maoz Vegetarian, "Chain event: In-N-Out Burger hasn't made it to Manhattan . . . yet. But, in the past few months, five chains with cult followings have opened in NYC. Are they worth the hype?", www.timeoutnewyork.com, Jun. 14-20, 2007.*
www.maozusa.com, printed history page from website, Apr. 28, 2006.*
Business Wire, "Hot Dog Heaven at 7-Eleven," pp. 1-2, Jul. 16, 2007 (Year: 2007).*

* cited by examiner

*Primary Examiner* — Jonathan P Ouellette
(74) *Attorney, Agent, or Firm* — Richard B. Cates

(57) ABSTRACT

A baked sandwich may be formed by baking a preparation comprised of a filler material provided between two portions of dough. The preparation is preferably formed from a pita dough to produced a freshly baked pita sandwich. The preparation is preferably baked in a conveyor oven. The baked sandwich is preferably cut into multiple pieces and provided to a customer. A variety of garnishes and sauces are preferably made available to the customer to be placed within the pieces of the baked sandwich.

4 Claims, No Drawings

BAKED SANDWICH AND METHOD OF ITS PREPARATION AND SALE

RELATED APPLICATIONS

This application claims priority from provisional application 61/069,523, filed 14 Mar. 2008, the entirety of which is incorporated herein by reference.

SUMMARY

This application describes a food item, a method of preparing the food item, and a process for operating a commercial establishment that sells the food item to customers.

The food item may be generally described as a baked pita sandwich. The sandwich is preferably baked in response to a customer order. The sandwich may contain one or more fillers, selected by the customer, that are then baked within a pita shell. After baking, the sandwich is cut into two halves and presented to the customer. The customer may open the sandwich halves and adds garnishes and sauces of the customer's choosing.

DETAILED DESCRIPTION

A process for preparing a baked sandwich will now be described.

The baked sandwich is preferably prepared from fresh pita dough. Pita dough is typically made from a simple mixture of wheat flour, water, sugar, salt and active yeast, and may contain small amounts of additional ingredients such as olive oil, vegetable oil, milk, or butter.

In the preferred process, the dough is prepared from fresh ingredients, then measured into units of a predetermined size. The units are then stored until needed, and may be refrigerated or kept at room temperature. The dough may be provided as balls of fresh pita dough that have been measured into units of approximately equal weight.

Upon receiving a customer order, a baked sandwich is prepared from the dough and one or more fillings. As a first step, two rounds of dough are prepared. In the preferred process, two pre-measured dough balls are rolled flat using a two-stage electric rolling machine that is calibrated to yield rounds having a thickness of approximately 3/16 inch. The balls of dough preferably have a weight of approximately 2.5 ounces and yield rounds that are approximately six to seven inches in diameter after rolling. The rounds may be pulled or spread by hand after rolling to shape and even the round.

A first of the rounds is then place on a perforated baking sheet. The perforated baking sheet may be formed of a wire mesh.

One or more fillers are then placed on the dough. The filler is spread evenly about the center of the round, leaving the dough exposed at the edges of the round.

In the preferred process, customers are offered the choice of a bean, chicken, or beef filler, with the option of adding various cheeses, beans, or olives to the filler. The fillers are added in predetermined amounts that have been found to provide ample thickness while also warming or cooking sufficiently during baking. Various other fillers may be provided in accordance with the customer's order and available ingredients. In general any meat, egg, cheese, legume, vegetable or fruit filler may be used. The filler may be pre-cooked, or may be cooked during baking.

After placing the filler on the first round, a second round is laid over the first round to cover the filler. The first and second rounds are then joined at their edges to enclose the filler within the pita dough. It is important that the edges of the rounds remain joined after baking. In practice it has been found that the rounds can be joined in a satisfactory manner by pinching the edges of the rounds together and then folding the edges back over onto the upper round.

After joining the edges, it is preferable to gently flatten the preparation by hand. This yields an unbaked dough and filler.

The dough and filler preparation is then baked for a period of time sufficient to bake the pita dough to a golden brown color and a slightly crisp consistency, while also warming or cooking the filler within the dough. In practice it has been found preferable to bake the dough and filler preparation in a conveyor oven, in which the item to be baked is transported on a conveyor under a heat source using so-called Impinger technology that directs forced heated air toward the product to be baked. The conveyor oven typically allows the operator to select the temperature within the oven and the period of time that it will take for the product to travel from the inlet of the oven to the outlet. In practice, using dough and filler preparations as described above and an oven as described above, it has been found that a temperature of approximately 540 degrees Fahrenheit and a travel time of approximately 2:40 provides adequate cooking of the dough and filler, producing a baked sandwich.

After baking, the baked sandwich is removed from the perforated baking sheet and cut into two halves. Each half may then be placed in a paper holder and presented to the customer.

The customer may then finish preparation of the baked sandwich in accordance with his preferences using sauces, dressings and garnishes furnished by the establishment. The customer typically spreads each half of the baked sandwich open and places the sauces and garnishes in the open space within the pocket formed by the baked pita shell. Examples of garnishes that may be provided include lettuce, cabbage and other leafy vegetables, tomato, cucumber, pepper, onion, fresh herbs, and pickled vegetables. Examples of sauces include olive oil, tahineh, hummus, hot sauces, and salad dressings.

The detailed process described here is a currently preferred process that has been developed for preparing and serving baked sandwiches to customers in a particular setting, and is implemented using widely available ingredients and commercial kitchen equipment. Persons skilled in the art of food preparation will recognize that there are many variables in food preparation and that some aspects of the process described here may be adjusted to provide optimal results when implemented in a different setting. Variables that may be adjusted include: the ingredients of the dough used to form the baked sandwich; the mass and dimensions of the dough rounds; the type and mass of filler or fillers, and whether the fillers are to be pre-cooked or are cooked as part of the baking process; the type of oven used; the temperatures of the dough and fillers, the ambient temperature in the preparation area, and the temperature and time of cooking; and, the types of sauces and garnishes made available to the customer. Further, while a rounded shape is preferred for the baked sandwich due to its ease of preparation through rolling of round dough portions, the baked sandwich may be produced in other shapes using appropriately shaped dough portions.

What is claimed is:

1. A method of providing a pita sandwich, comprising:
receiving an order from a customer in which one or more fillers are identified by the customer for inclusion in a pita sandwich;
providing a lower portion of flattened dough;
placing the one or more fillers onto the lower portion of flattened dough, wherein the one or more fillers are spread about the center of the lower portion such that the edges of the lower portion are left exposed;
providing an upper portion of flattened dough;
placing the upper portion of flattened dough onto the lower portion of flattened dough and onto the one or more fillers to thus form a pita sandwich;
crimping edges of the upper and lower portions together to form crimped edges;
folding the crimped edges over onto the upper portion;
gently flattening the pita sandwich;
after gently flattening the pita sandwich by hand, baking the pita sandwich in an oven;
after baking the pita sandwich, cutting the sandwich into two halves, wherein each half comprises a pocket therein;
providing the two halves of the pita sandwich to the customer who provided the order identifying the fillers;
providing sauces and garnishes to the customer in a manner that enables the customer, after receiving the two halves of the pita sandwich, to selectively place one or more of the garnishes and sauces into the pockets of the pieces of the baked pita sandwich.

2. The method of claim 1, wherein the one or more fillers comprise meat, egg, cheese, legume, vegetable, or fruit.

3. The method of claim 1, wherein providing garnishes and sauces to the customer comprises providing lettuce, cabbage, other leafy vegetables, tomato, cucumber, pepper, onion, fresh herbs, or pickled vegetables.

4. The method of claim 1, wherein providing garnishes and sauces to the customer comprises providing olive oil, tahineh, hummus, hot sauces, or salad dressings.

* * * * *